Patented June 24, 1952

2,601,666

UNITED STATES PATENT OFFICE 2,601,666

PROCESS OF PREPARING THERMOSETTING RESINS FROM UREA, AN ALDEHYDE AND AMINOALIPHATIC CARBOXYL COMPOUNDS AND DERIVATIVES THEREOF

George E. Niles, Winchester, Mass., assignor to Monsanto Chemical Company, St. Louis, Mo., a corporation of Delaware No Drawing. Application October 29, 1949, Serial No. 124,495

9 Claims. (Cl. 260—70)

This invention relates to processes for the production of improved thermosetting resins which are suitable for imparting wet strength characteristics to paper products.

It is one object of this invention to provide processes for preparing water-soluble and highly condensed thermosetting resins which are characterized by good stability in aqueous solutions, and which are capable of imparting improved wet strength to paper products in which they are incorporated.

Still further objects and advantages of this invention will be apparent from the following description and the appended claims.

The objects of this invention are attained, in general, by first reacting, in an alkaline aqueous solution, urea and formaldehyde or a compound capable of yielding formaldehyde on heating in an aqueous solution, for example, para formaldehyde and an amino aliphatic compound containing from 1 to 6 carbon atoms and selected from the group consisting of amino aliphatic monocarboxylic acids, amino aliphatic dicarboxylic acids, water-soluble salts of such acids and addition compounds of such acids and salts with formaldehyde, for example, an acid such as glycine (also known as amino ethanoic acid) or the sodium salt thereof or its addition product with formaldehyde. In carrying out this reaction the urea and formaldehyde are first reacted in the absence of such acid or watersoluble salt until a methylolated urea or ureaformaldehyde condensation product is formed. The amino aliphatic acid or water-soluble salt thereof, or its addition product with formaldehyde, is then added to the solution of the methylolated urea. For best results, it is preferred to add the amino-aliphatic acid or its salt after it has been first reacted with formaldehyde to form an addition product of such acid or salt and the formaldehyde, preferably by using equal molecular proportions of such acid or salt and formaldehyde to form the addition product.

The resulting solution is concentrated until it contains from 55 to 65% by weight of resin solids without materially altering the degree of polymerization of the methylolated urea. This is accomplished by vacuum concentrating or "flash" concentrating the solution as is described in greater detail hereinafter.

The concentrated solution, that is, the solution containing from 55 to 65% by weight of resin solids is then made acidic or acid reacting by the addition of an acid, preferably a mineral acid such as sulfuric acid. The amino aliphatic acid or its water-soluble salt or its addition product with formaldehyde reacts with the methylolated urea under these conditions to form a resinous product which contains aliphatic carboxylate residues or groupings and concurrently the resinous product so formed condenses or polymerizes to form a product of increased molecular weight as is evidenced by an increase in viscosity of the resin solution. The resin is allowed to condense and polymerize until a solution of the resin at 60% by weight resins solids concentration has a viscosity of 5 to 10 poises as measured by the Gardner-Holdt bubble viscometer.

The solution is then made alkaline by the addition of a water-soluble base such as sodium hydroxide to minimize or prevent further condensation of the resin. Other water-soluble bases such as the alkali metal hydroxides and carbonates, and the quaternary ammonium hydroxides, for example, trimethyl benzyl ammonium hydroxide are also used for this purpose instead of sodium hydroxide. The alkaline nature of the solution at this stage retards the further polymerization of the resin and although further polymerization is not entirely prevented, it is slowed down to such an extent that the solution is stable to gellation for relatively long periods, for example, from 2 to 3 months.

Heating the solution during the reaction between the urea and the formaldehyde, and during the reaction between the methylolated urea and the amino aliphatic acid or its water-soluble salts increases the rate of reaction and is preferred. However, both of these reactions should be carried out below the boiling point of the solution for best results.

The proportions of urea, formaldehyde and the amino aliphatic acid or its water-soluble salts used may be varied to some extent. Thus, it is possible, for example, to employ from 2 to 4 molecular proportions of formaldehyde and from 0.05 to 0.5 molecular proportion of such acid or salt for each molecular proportion of urea.

As examples of suitable amino aliphatic acids or water-soluble salts thereof or their addition products with formaldehyde which come within the scope of the compounds hereinbefore defined may be mentioned, glycine, alanine, β-alanine, aspartic acid, amino malonic acid and such salts as the sodium salts of glycine (also known as amino ethanoic acid), the sodium salt of alanine (also known as 2-amino propionic acid), the sodium salt of β-alanine (also known as 3-amino propionic acid), the sodium salt of aspartic acid (also known as amino succinic acid), the sodium salt of amino malonic acid and the like and their addition compounds with formaldehyde. Instead of the sodium salt other water-soluble salts are also used such as the other alkali metal salts, for example, the potassium, lithium and like salts. The preferred compounds for use in preparing the resinous products of this invention are the addition product of formaldehyde and glycine and the sodium salt thereof and the addition product of formaldehyde and amino succinic acid (aspartic acid) and the sodium salt thereof or glycine per se.

The amino aliphatic acid or its water-soluble salts or the addition product thereof with formaldehyde are preferably added as such to the solution of methylolated urea. However, the acid per se may be added to such solution together with a water-soluble base such as an alkali metal base, for example, an alkali metal hydroxide or carbonate in an amount sufficient to neutralize such acid. Thus the salt is formed in the solution in situ.

A preferred process for preparing water-soluble and highly condensed resins which are suitable for imparting wet strength to paper products is described below. Such resins are prepared by first reacting 1 molecular proportion of urea with from 2 to 3 molecular proportions of formaldehyde, as formalin, in water until a methylolated urea is obtained. Best results are obtained by using 2.2 to 2.5 molecular proportions of formaldehyde. In most instances satisfactory results are obtained in subsequent reactions when the methylolated urea contains from 1.2 to 2 mols of combined formaldehyde. This reaction is carried out at slightly elevated temperatures, for example, at temperatures between about 50° and 70° C. Moreover, the solution should be alkaline during the reaction. Satisfactory results are obtained at a pH between 7.2 and 8.5. For best results it is preferred to maintain the solution at a pH between 7.5 and 8.0. Normally the pH is adjusted at the beginning of the reaction by the addition of a base such as an alkali metal hydroxide or carbonate, for example, sodium hydroxide or carbonate. In some instances the pH may drop as the reaction proceeds and further base is added to maintain the alkalinity of the mixture. The duration of the reaction is primarily dependent upon the pH and temperature of the mixture. In general, the desired degree of methylolation of the urea is obtained within a period of 15 to 120 minutes.

It is necessary to correlate the pH and temperature of the mixture and the duration of the reaction to secure the best results. By increasing the temperature up to 70° C. and by lowering the pH toward 7.2, the reaction rate is increased. A reaction period of 15 minutes is usually satisfactory under such conditions. At lower temperatures and higher pH values a reaction period of 120 minutes may be required.

The solution of methylolated urea which is obtained in accordance with the foregoing procedure is next treated with the amino aliphatic acid or its water-soluble salts or their addition products with formaldehyde. From 0.05 to 0.5 molecular proportion of the addition product of formaldehyde and amino ethanoic acid, for example, is added to the solution of the methylolated urea for each molecular proportion of urea contained therein. In most instances it is preferred to employ from 0.05 to 0.3 molecular proportion of such addition product, acid or salt for each molecular proportion of urea since it is thus possible to obtain superior wet strength resins.

After the addition of the addition product of formaldehyde and amino ethanoic acid or the other amino aliphatic acids or their water-soluble salts, and while the solution of methylolated urea is still alkaline, the solution is concentrated without appreciably changing the degree of polymerization of the methylolated urea, or while maintaining the initial degree of polymerization of the methylolated urea until the solution contains from about 55 to 65% by weight of resin solids. Best results are obtained by concentrating to from 58 to 62% solids content. The solution is generally concentrated to the requisite solids content, without appreciably changing the degree of polymerization of the methylolated urea, by vacuum concentration, or by "flash" concentration either with or without the use of vacuum. The solution is vacuum concentrated by subjecting it to a vacuum of at least 40 millimeters of mercury (absolute) and at a temperature not in excess of 65° C. By using a higher vacuum, that is, less than 15 millimeters of mercury and temperatures close to 65° C. the rate of concentration is increased. Best results have been obtained by subjecting the solution to a vacuum of 5 to 15 millimeters of mercury at a temperature of 55 to 60° C.

The solution is "flash" concentrated by pumping it through a heated pipe, for example a jacketed pipe which is heated by steam, so that a small portion of the solution passing through the pipe from the pump to the outlet end of the pipe is concentrated to the desired solids content in a very short interval of time, for example, from 0.01 to 0.3 second and the solution is then cooled. When using the "flash" concentration procedure for concentrating the solution it is necessary to correlate the temperature to which the solution is heated, the rate of flow and the diameter of the pipe so that the solution will be concentrated within a very short period of time as defined above. Best results have been obtained, from the standpoint of stability of the final product, by employing a vacuum during "flash" concentration, that is, by pumping the solution through a heated pipe which is at least partially evacuated.

By employing the vacuum concentrating or "flash" concentrating procedures as described above, it is possible to concentrate the resin solution to the desired solids content without materially altering or changing the degree of polymerization of the methylolated urea. This is particularly important in the preparation of wet strength resins since any marked change in the degree of polymerization of the methylolated urea at this stage of the process results in final products having inferior wet strength properties. In some instances it is possible to prepare solutions of methylolated urea having the specified solids content, for example, by using paraformaldehyde, and in such cases the solution need not be concentrated.

After the resin solution has been concentrated to the desired solids content as described above, it is acidified, that is rendered acidic by the addition of an acid, for example, a mineral acid such as sulfuric acid, phosphoric acid and the like.

The pH of the solution after acidification should be between about 4.5 and 5.5 for best results. The solution is then heated to bring about a reaction between the methylolated urea and the amino ethanoic acid or its water-soluble salts or its addition product with formaldehyde. This reaction is generally carried out at a temperature between about 80 and 95° C., care being taken to prevent boiling. It is usually desirable to carry out the reaction using a reflux condenser to avoid loss of water and a stirrer to minimize gel formation on the heat exchange surfaces. The resulting resin condenses as the reaction proceeds and eventually reaches a high state of condensation as is evidenced by a continued rise in the viscosity of the solution. If the condensation of the resin is carried too far a gel-like resin is obtained. The rate of condensation is largely dependent on the pH of the solution and the temperature to which the solution is heated, the rate of condensation increasing at higher temperatures and lower pH values. The resin solution is heated at the temperatures and pH values indicated above until the viscosity of the solution at 60% resin solids content is between about 5 and 10 poises as measured by the Gardner-Holdt bubble viscometer. At these viscosities the resin has maximum wet strength properties and is highly condensed.

Further condensation of the resin is substantially prevented or minimized by making the solution alkaline by the addition of a water-soluble base after the solution has reached the desired viscosity. Any water-soluble base which does not precipitate the resin may be used for this purpose including the alkali metal hydroxides or carbonate such as sodium hydroxide or carbonate, or a quaternary ammonium hydroxide such as trimethyl benzyl ammonium hydroxide. The amount of base added should be sufficient to render the solution alkaline or alkaline reacting, and preferably should be sufficient to provide a solution having a pH between about 7.5 and 8.5. It is preferred to make the resin solution alkaline, as described above, before the solution is allowed to cool.

The resin solutions obtained according to the foregoing procedure consist of a water solution of a water-soluble and highly condensed thermosetting resin and contain from about 55 to 65% resin solids. Such solutions are infinitely dilutable and are quite stable when stored at room temperature and particularly in cold storage at a temperature above the freezing point of the solution. The resin particles in the solution are highly substantive to negatively charged cellulosic substances such as paper pulp fibers in the presence of aluminum ions, for example, the aluminum ions derived from a solution of papermaker's alum (aluminum sulfate) in water. This property makes these particular resins particularly suitable for addition to paper pulp in the beater in the presence of alum since a predominant amount of the resin is picked up by or deposited on the paper pulp fibers and only minor amounts of the resin are lost in the white water after the paper forming operation. However, these resins are not only highly substantive, but also have the property of imparting high wet strength to paper products.

These resin solutions may be dried, if desired, for example by spray drying, vacuum drying, drum drying and the like or by simple evaporation of water. By drying such solutions, it is possible to obtain solid products which are readily soluble in water and which have substantially the same properties as the original resin in solution. By using mild drying conditions, that is, relatively low temperatures, it is possible to form solid products which have the same and, in some instances, higher wet strength properties than the original resin as prepared. Such drying is best carried out by subjecting the solution to a vacuum of at least 40 millimeters of mercury and temperatures below the boiling point of the solution.

The wet strength resins prepared in accordance with the preferred process as hereinbefore described are normally incorporated in paper products by adding them to an aqueous slurry of paper pulp together with acids or papermaker's alum, preferably alum, to render the resin substantive to the paper fiber. The resins are generally employed in an amount sufficient to provide from 0.25 to 5% by weight of resin solids based on the oven dry weight of the paper pulp. Satisfactory results are obtained, in most instances, by using from 1 to 3% by weight of the resin. After the paper pulp has been formed into a paper product such as paper sheeting, the resin is cured in situ in the paper, that is, the resin is rendered insoluble and infusible in the paper product. This curing operation may be performed in various ways. One particularly convenient mode of operation consists in forming a paper sheeting in the customary manner, drying the sheeting on heated rolls and then winding the paper sheeting while it is still warm or hot into rolls. By operating in this manner, the finished rolls, after removal from the paper-making machine, remain warm for several days and sometimes for a week in storage and the resin becomes infusible and insoluble under such conditions. If desired, the curing operation may be carried out by heating the paper at elevated temperatures, for example, at 150° F. to 300° F. until the resin becomes insoluble and infusible. At such temperatures the resin is cured in the paper within a relatively short period of time.

A further understanding of this invention will be obtained from the following specific examples which are intended to further illustrate this invention, but are not intended to limit the scope thereof, parts and percentages being by weight unless otherwise specified.

*Example I*

One molecular proportion of urea and 2.5 molecular proportions of formaldehyde, in the form of a 37% aqueous solution, were stirred together and the pH of the mixture was adjusted between 7.5 and 7.9 with caustic soda. The mixture was then heated, with stirring, at 60 to 65° C. for a period of 60 minutes. To the resulting solution was added the addition product of 0.2 molecular proportion of glycine and 0.2 molecular proportion of formaldehyde, which formaldehyde was used in the form of a 37% aqueous solution. The resulting solution was concentrated until it contained 60% solids by subjecting it to a vacuum of 5 to 15 millimeters of mercury and concurrently heating the solution to a temperature of 55° C. and maintaining the solution at such temperature. The concentrated solution was then acidified to a pH of 5 (glass electrode) by the addition of sulfuric acid, after which it was heated to a temperature of 95° C. under reflux, with stirring, until its viscosity was 5 poises as measured with the Gardner-Holdt bubble viscometer. The pH was then adjusted to a pH of 7.5 to 8.0

(hydrion paper) with caustic soda and the solution was then rapidly cooled to room temperature (about 25° C.).

The above resin solution was applied to paper pulp in the beater according to the following procedure. Bleached sulfite pulp was first refined to 350 c. c. TAPPI (Technical Association of the Pulp and Paper Industries) standard freeness at 2% consistency in a laboratory refiner. Quantities of this refined stock sufficient to prepare hand sheets were used. To the refined stock was added a quantity of resin solution at 60% solids sufficient to provide 1.5% of resin solids based on the oven dry pulp solids. The resulting mixture was stirred for 15 minutes and then 3% of papermakers' alum (aluminum sulfate), based on the oven dry pulp, was added and the whole stirred for an additional 15 minutes. This mixture was made into hand sheets on a Noble-Wood Laboratory sheet machine. These hand sheets were aged in an oven at 105° C. for 4 hours to rapidly cure the resin and develop the wet strength. The sheets were cut into strips 15 millimeters in width and soaked in water for 16 hours. The wet sheets were then tested for wet tensile strength with a Schopper tensile tester. This testing procedure is described in greater detail in TAPPI Testing Method T-456 M44. The wet strength of the sheets averaged 3.82 pounds per inch as compared to 1.75 pounds per inch for a control hand sheet prepared from the same pulp but without resin treatment.

Example II

One molecular proportion of urea and 2.5 molecular proportions of formaldehyde, in the form of a 37% aqueous solution, were stirred together and the pH was adjusted between 7.5 and 8.0 with caustic soda. The mixture was then heated for 1 hour at a temperature of 60 to 65° C. To the resulting solution was added the addition product of 0.2 molecular proportion of aspartic acid and 0.2 molecular proportion of formaldehyde, with formaldehyde was used in the form of a 37% aqueous solution. The resulting solution was subjected to a vacuum of 5 to 15 millimeters of mercury and maintained at a temperature between 45 and 55° C. until it contained 60% resin solids. The pH of the solution was then adjusted to 5 with sulfuric acid, after which the solution was heated at 95° C. under a reflux condenser and with stirring until the viscosity of the solution had reached 5 poises as measured by the Gardner-Holdt bubble viscometer. This reaction required approximately 1 hour. The pH of the solution was then raised to a pH of 7.5 to 8.0 (as measured by hydrion paper) by the addition of caustic soda and the solution was then cooled to about 25° C.

The resin solution obtained in the manner described immediately above had good stability in storage at room temperature and was infinitely dilutable with water.

The above resin solution was applied to sulfite paper pulp in the beater using the same pulp and the same procedure described in Example I. Hand sheets prepared from the treated pulp were dried for 4 hours at 105° C. to cure the resin and to develop the wet strength of the paper sheet. Strips of the hand sheet, the strips being 15 millimeters wide, were immersed in water for 16 hours and tested for wet tensile strength with a Schopper tensile tester. The wet strength of the sheets averaged 3.10 pounds per inch as compared to 1.75 pounds per inch for a control hand sheet, that is a hand sheet which had not been treated with resin.

Various modifications and changes may be made in the processes of this invention and in the starting materials used in the preparation of the resinous products of this invention as will be apparent to those skilled in the art from a consideration of the foregoing description. It is accordingly intended that the scope of this invention be limited only by the scope of the appended claims.

What is claimed is:

1. A process of preparing a nitrogen-containing thermosetting resin which is suitable for imparting wet strength when incorporated in paper products which comprises reacting 1 molecular proportion of urea with from 2 to 4 molecular proportions of a substance selected from the group consisting of formaldehyde and a compound capable of yielding formaldehyde on heating in an aqueous solution in an alkaline aqueous solution to form a methylolated urea; adding to the resulting solution from 0.05 to 0.5 molecular proportion of an amino aliphatic compound containing from 2 to 6 carbon atoms and selected from the group consisting of mono-amino alkanoic acids, mono-amino alkandioic acids, water-soluble salts thereof and addition compounds of said acids and salts with formaldehyde; concentrating the resulting solution to a solids content of 55 to 65% by weight without materially changing the degree of polymerization of said methylolated urea; adding an acid to said solution until the solution is acidic; allowing the methylolated urea and said amino aliphatic component to react and condense until the viscosity of the solution at 60% by weight resin solids is between about 5 and 10 poises as measured by the Gardner-Holdt bubble viscometer; and then adding a water-soluble base to the solution until the solution is sufficiently alkaline to minimize further increases in viscosity of the solution.

2. A process according to claim 1, but further characterized in that the amino aliphatic compound is the addition product of glycine and formaldehyde.

3. A process according to claim 1, but further characterized in that the amino aliphatic compound is the addition product of aspartic acid and formaldehyde.

4. A process according to claim 1, but further characterized in that the amino aliphatic compound is glycine.

5. A process of preparing a nitrogen-containing thermosetting resin which is suitable for imparting wet strength when incorporated in paper products which comprises reacting 1 molecular proportion of urea with from 2 to 3 molecular proportions of formaldehyde in an alkaline aqueous solution at a pH between about 7.2 and 8.5 and at a temperature between about 50 and 70° C. to form a methylolated urea; adding to the resulting solution from 0.05 to 0.5 molecular proportion of an amino aliphatic compound containing from 2 to 6 carbon atoms and selected from the group consisting of mono-amino alkanoic acids, mono-amino alkandioic acids, water-soluble salts thereof and addition compounds of said acids and salts with formaldehyde; concentrating the resulting solution to a solids content of 55 to 65% by weight without materially changing the degree of polymerization of said methylolated urea; adding an acid to the resulting solution until the pH thereof is between about 4.5 and 5.5; heating the solution at a temperature above about 80° C. but below the boiling point of the solution until the viscosity of the solution at 60% by weight resin solids is between about 5 and 10 poises as measured by the Gardner-Holdt bubble viscometer; and then adding a water-soluble base to the solution until the solution is sufficiently alkaline to minimize further increases in viscosity of the solution.

6. A process according to claim 5, but further characterized in that the amino aliphatic compound is the addition product of glycine and formaldehyde.

7. A process according to claim 5, but further characterized in that the amino aliphatic compound is the addition product of aspartic acid and formaldehyde.

8. A process according to claim 5, but further characterized in that the amino aliphatic compound is glycine.

9. A process of preparing a nitrogen-containing thermosetting resin which comprises reacting 1 molecular proportion of urea with from 2 to 4 molecular proportions of a substance selected from the group consisting of formaldehyde and a compound capable of yielding formaldehyde on heating in an aqueous solution, in an alkaline aqueous solution to form a methylolated urea; adding to the resulting solution from 0.05 to 0.5 molecular proportion of an amino aliphatic compound containing from 2 to 6 carbon atoms and selected from the group consisting of mono-amino alkanoic acids, mono-amino alkandioic acids, water-soluble salts thereof and addition compounds of said acids and salts with formaldehyde; concentrating the resulting solution to a solids content of 55 to 65% by weight without materially changing the degree of polymerization of said methylolated urea; acidifying the resulting solution; allowing the methylolated urea and said amino aliphatic component to react and condense until the viscosity of the solution at 60% by weight of resin solids is between about 5 and 10 poises as measured by the Gardner-Holdt bubble viscometer; and then making the solution alkaline with a water-soluble base.

GEORGE E. NILES.

REFERENCES CITED

The following references are of record in the file of this patent:

UNITED STATES PATENTS

| Number | Name | Date |
| --- | --- | --- |
| 2,389,415 | D'Alelio | Nov. 20, 1945 |

FOREIGN PATENTS

| Number | Country | Date |
| --- | --- | --- |
| 898,175 | France | June 26, 1944 |